Patented Mar. 19, 1929.

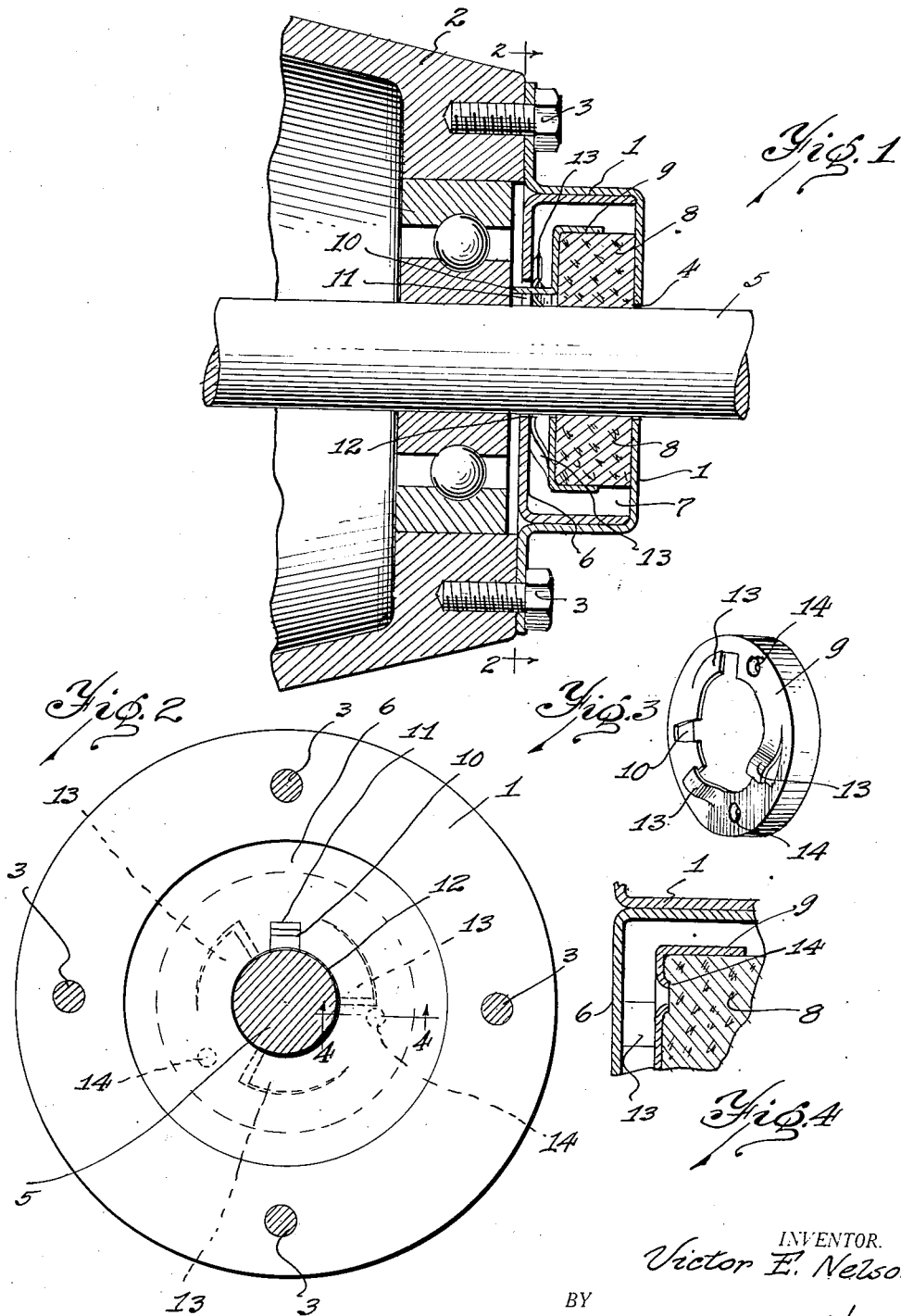

1,706,181

UNITED STATES PATENT OFFICE.

VICTOR E. NELSON, OF PONTIAC, MICHIGAN.

PACKING FOR SHAFTS.

Application filed July 27, 1925. Serial No. 46,331.

This invention relates to packing for shafts, and the object of the invention is to provide a packing adapted to prevent grease or oil leakage along a shaft and arranged to pack the shaft even when there is side play and end play of the shaft.

Another object of the invention is to provide a packing for shafts in which the packing is held from rotation, while the shaft is rotatable therein and in which the packing may move with the shaft if the shaft has any side play.

Another object of the invention is to provide a packing for shafts in which the packing is mounted in a casing and is adapted to pack the casing wall to prevent leakage about the packing as well as along the shaft.

A further object of the invention is to provide a retainer for the packing ring adapted to maintain a tension on the packing ring to hold it in packing position at all times.

These objects and the several novel features of the invention are hereinafter more fully described and claimed and the preferred form of construction by which these objects are attained is shown in the accompanying drawings in which—

Fig. 1 is a section through the end of a transmission housing showing my packing as utilized therewith.

Fig. 2 is a section taken on line 2—2 of Fig. 1.

Fig. 3 is a perspective view of the retainer for the packing ring.

Fig. 4 is an enlarged section taken on line 4—4 of Fig. 2.

As shown in Fig. 1 a cup shaped cap 1 is secured to the transmission housing 2 by the bolts 3. The cup shaped cap 1 is provided with an aperture 4 at the center slightly larger than the shaft 5 and a cup shaped casing 6 is pressed into the cap 1 to form a chamber 7 between the casing 6 and the cap 1. A packing ring 8 made of cork or other suitable packing material is positioned within the chamber 7 and a cup shaped sheet metal retainer 9 is positioned over the packing ring 8 as shown in Fig. 1. The retainer 9 is provided with an outwardly extending lug 10 shown in Figs. 1, 2 and 3 which extends through a notch 11 provided in the casing 6 and opening into the aperture 12 in the casing 6 which is slightly larger than the diameter of the shaft 5. The retainer 9 as shown in Figs. 1 and 3 is provided with three spring lugs 13 struck up from the body of the retainer and these spring lugs 13 as shown in Fig. 1 are adapted to engage the inner wall of the casing 6 and the tension of these lugs forces the packing ring 8 into engagement with the inner face of the cap 1. As shown in Figs. 3 and 4 the retainer 9 is provided with depressions 14 which extend into the packing ring 8 and thus hold the packing ring in fixed relation with the retainer.

By means of the lug 10 extending through the notch 11 the retainer 9 is held from rotation and by means of the depressions 14 the packing ring 8 is also held from rotation. This packing ring 8 closely fits the shaft 5 and prevents leakage along the shaft and by means of the spring prongs or lugs 13 on the retainer, the packing ring is held in engagement with the inner face of the cap 1 and prevents leakage about the packing ring and between the cap 1 and packing ring. Should there be any side play of the shaft 5 the packing ring is moved in its plane by the shaft and continues to pack the inner face of the cap and the shaft 5 which rotates in the packing ring 8. The aperture 4 for the shaft 1 and the aperture 12 in the casing 6 are slightly larger than the diameter of the shaft 5 so that side play of the shaft will not damage these parts and the notch 11 is made of sufficient depth to allow movement of the retainer lug 10 and packing ring with the shaft 5.

From the foregoing description it becomes evident that the device is very simple and efficient in operation, is composed of sheet metal parts and is of consequent low manufacturing cost, will prevent leakage along a shaft or about the packing ring and provides a device which accomplishes the objects described.

Having thus fully described my invention, its utility and mode of operation, what I claim and desire to secure by Letters Patent of the United States is—

1. A packing for shafts comprising the combination with a shaft and its bearing and housing therefor, of a cap having a lateral flange secured to the housing and provided with an aperture for the shaft of greater diameter than the shaft, a casing secured in the cap and forming a chamber between the casing and cap, the casing being provided with an aperture through which the shaft extends and with a notch opening into the said aperture, a packing ring positioned within the said chamber and closely fitting about the shaft, a cup shaped retainer fitting over the packing ring and having an aperature for the shaft, a series of spring lugs struck up from the body of the retainer and riding in contact with the inner face of the casing, the spring lugs forcing the packing ring into engagement with the inner face of the cap about the aperture for the shaft, and a lug extending from the retainer and engaging in the notch of the casing.

2. A packing for shafts comprising the combination with a shaft and its bearing and housing therefor, of a cap having a lateral flange secured to the housing and provided with an aperture for the shaft of greater diameter than the shaft, a casing secured in the cap and forming a chamber between the casing and cap, the casing being provided with an aperture through which the shaft extends and with a notch opening into the said aperture, a packing ring positioned within the said chamber and closely fitting about the shaft, a cup shaped retainer fitting over the packing ring and having an aperture for the shaft, the retainer being provided with a series of depressions extending into the packing ring and preventing rotation of the packing ring relative to the retainer, a series of spring lugs struck up from the body of the retainer and riding in contact with the inner face of the casing, the spring lugs forcing the packing ring into engagement with the inner face of the cap about the aperture for the shaft, and a lug extending from the retainer and engaging in the notch of the casing to prevent rotation of the retainer and packing ring.

In testimony whereof I sign this specification.

VICTOR E. NELSON.